United States Patent
Jinbo et al.

[11] Patent Number: 5,995,323
[45] Date of Patent: Nov. 30, 1999

[54] CIRCULATION FILTER MOUNTING STRUCTURE IN DISK DRIVE

[75] Inventors: Masaki Jinbo; Shinichi Fukuzawa, both of Kawasaki; Kazunori Shikano, Higashine, all of Japan

[73] Assignee: Fujitsu Limited, Kawasaki, Japan

[21] Appl. No.: 08/895,538

[22] Filed: Jul. 17, 1997

Related U.S. Application Data

[63] Continuation of application No. 08/498,997, Jul. 6, 1995, abandoned.

[30] Foreign Application Priority Data

Oct. 31, 1994 [JP] Japan .................................. 6-266510

[51] Int. Cl.$^6$ .................................................. G11B 33/14
[52] U.S. Cl. ...................................................... 360/97.02
[58] Field of Search ............................. 360/97.01, 97.02, 360/97.03; 369/75.1

[56] References Cited

U.S. PATENT DOCUMENTS

| | | | |
|---|---|---|---|
| 4,587,645 | 5/1986 | Wong et al. | 369/75.1 |
| 5,101,305 | 3/1992 | Ohkita et al. | 360/97.02 |
| 5,406,431 | 4/1995 | Beecroft | 360/97.02 |
| 5,417,743 | 5/1995 | Dauber | 96/13 |

FOREIGN PATENT DOCUMENTS

| | | |
|---|---|---|
| 60-133578 | 7/1985 | Japan . |
| 2281495 | 11/1990 | Japan . |
| 2281496 | 11/1990 | Japan . |

*Primary Examiner*—George J. Letscher
*Attorney, Agent, or Firm*—Greer, Burns & Crain Ltd.

[57] ABSTRACT

A circulation filter mounting structure in a disk drive including a housing having a base and a cover fixed to the base, a disk as a storage medium rotatably contained in the housing, and a head contained in the housing for recording and reproducing data on the disk. The circulation filter mounting structure includes a wall provided between an outer circumference of the disk and an inner surface of the housing, for partially blocking an air flow generated by rotation of the disk, the wall extending in a direction substantially perpendicular to a radial direction of the disk, and a filter mounted between the wall and the inner surface of the housing, for collecting dust.

22 Claims, 8 Drawing Sheets

CIRCULATION FILTER MOUNTING STRUCTURE IN DISK DRIVE

This is a continuation of application Ser. No. 08/498,997 filed on Jul. 6, 1995 now abandoned.

BACKGROUND OF THE INVENTION

1. Field of the Invention

The present invention relates to a circulation filter mounting structure in a disk drive such as a magnetic disk drive or an optical disk drive.

2. Description of the Related Art

In general, a magnetic disk drive for a computer adopts a contact start and stop (CSS) system defining a relation between a magnetic head and a magnetic disk facing it. In this system, while the disk is being rotated, the head is kept flying from the disk at a microscopic height owing to the balance between a flying force applied to the head by an air flow generated by high-speed rotation of the disk and an elastic force of a spring arm pressing the head on the disk.

In such a magnetic disk drive, if dust is present inside the disk drive, the dust enters a gap between the magnetic head and the magnetic disk during rotation of the disk to cause read error or in the worst case, may cause head crash. To cope with this problem, the magnetic disk drive employs a breather filter for preventing entry of dust from the outside of the disk drive and a circulation filter for collecting dust generated inside the disk drive.

Figure 7:
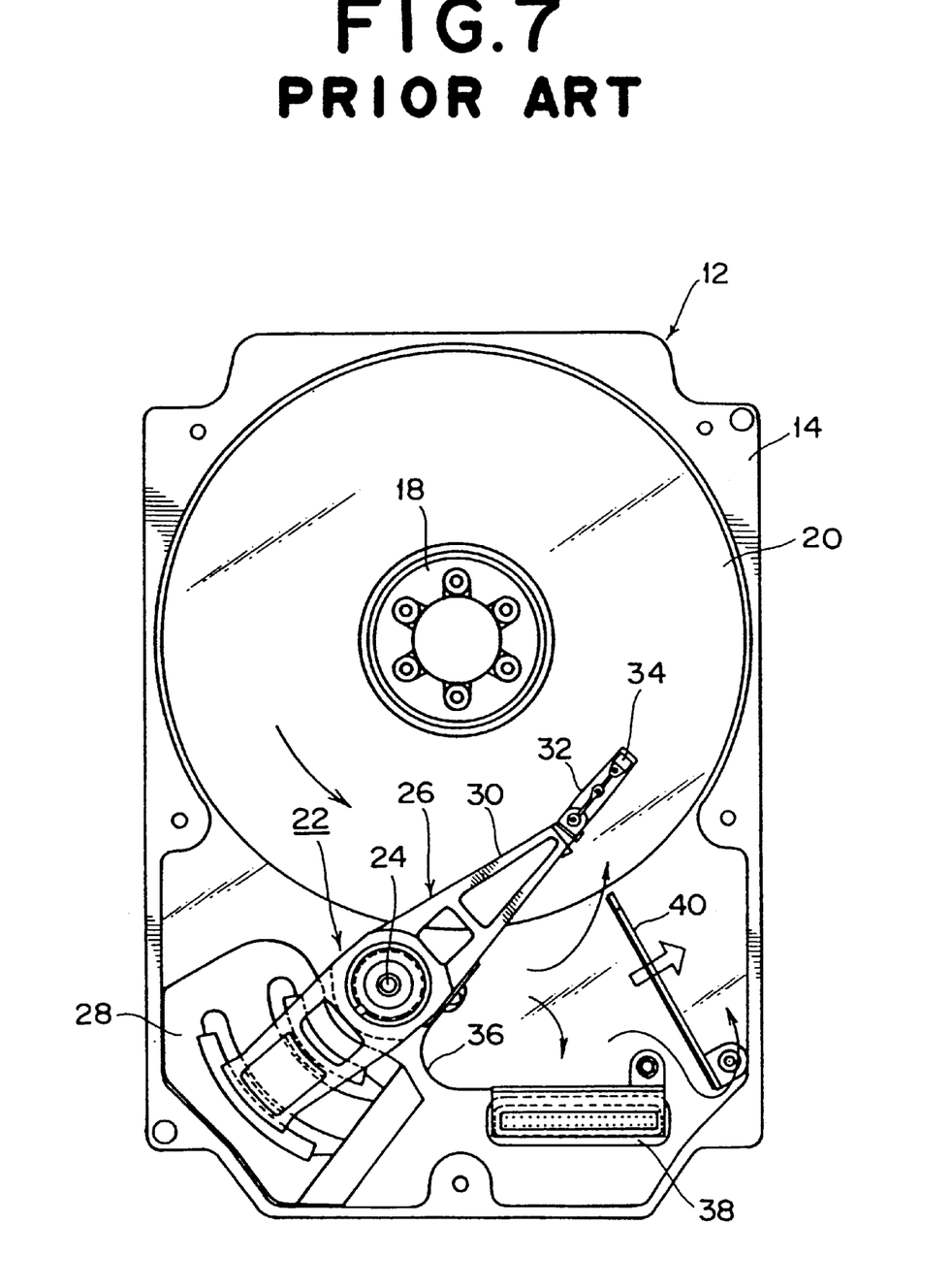
FIG. 7 is a top plan view of a magnetic disk drive in the prior art.

Referring to FIG. 7, there is shown a top plan view of a conventional magnetic disk drive having such a circulation filter under the condition where a cover (not shown) is removed. Reference numeral 12 denotes a housing (enclosure) composed of a base 14 and the cover. A spindle hub to be rotatably driven by an inner hub motor (not shown) is provided on the base 14. A plurality of magnetic disks 20 and spacers (not shown) are alternately stacked and mounted on the spindle hub. That is, the plurality of magnetic disks 20 are regularly spaced from each other and are fixedly mounted on the spindle hub by securing a disk clamp 18 to the spindle hub by screws.

Reference numeral 22 denotes a rotary head actuator composed of an actuator arm assembly 26 and a magnetic circuit 28. The actuator arm assembly 26 is rotatably mounted on a shaft 24 fixed to the base 14, and has a plurality of actuator arms 30 extending in one direction from the center of rotation. A spring arm 32 supporting a magnetic head 34 is fixed to one end portion of each actuator arm 30.

Reference numeral 36 denotes a flexible printed circuit sheet (FPC) for taking out a signal from each magnetic head 34. The flexible printed circuit sheet 36 is fixed at its one end to the actuator arms 30 and is connected at the other end to a connector 38. A circulation filter 40 is provided in the vicinity of the head actuator 22 where dust tends to be generated, so as to immediately collect the dust generated.. However, in such a conventional structure having the circulation filter 40 located at that position, an air flow generated by the rotation of the disks 20 is disturbed by the head actuator 22 located upstream of the circulation filter 40 in respect of the flowing direction of the air flow, and becomes stagnant before the filter 40. Accordingly, the dust cannot be efficiently filtered off by the filter 40. Further, as large spaces are present on the right and left sides of the filter 40, the air partially flows through these large spaces without being passed through the filter 40. Accordingly; the dust contained in the air flow is not filtered off by the filter 40.

Figure 8:
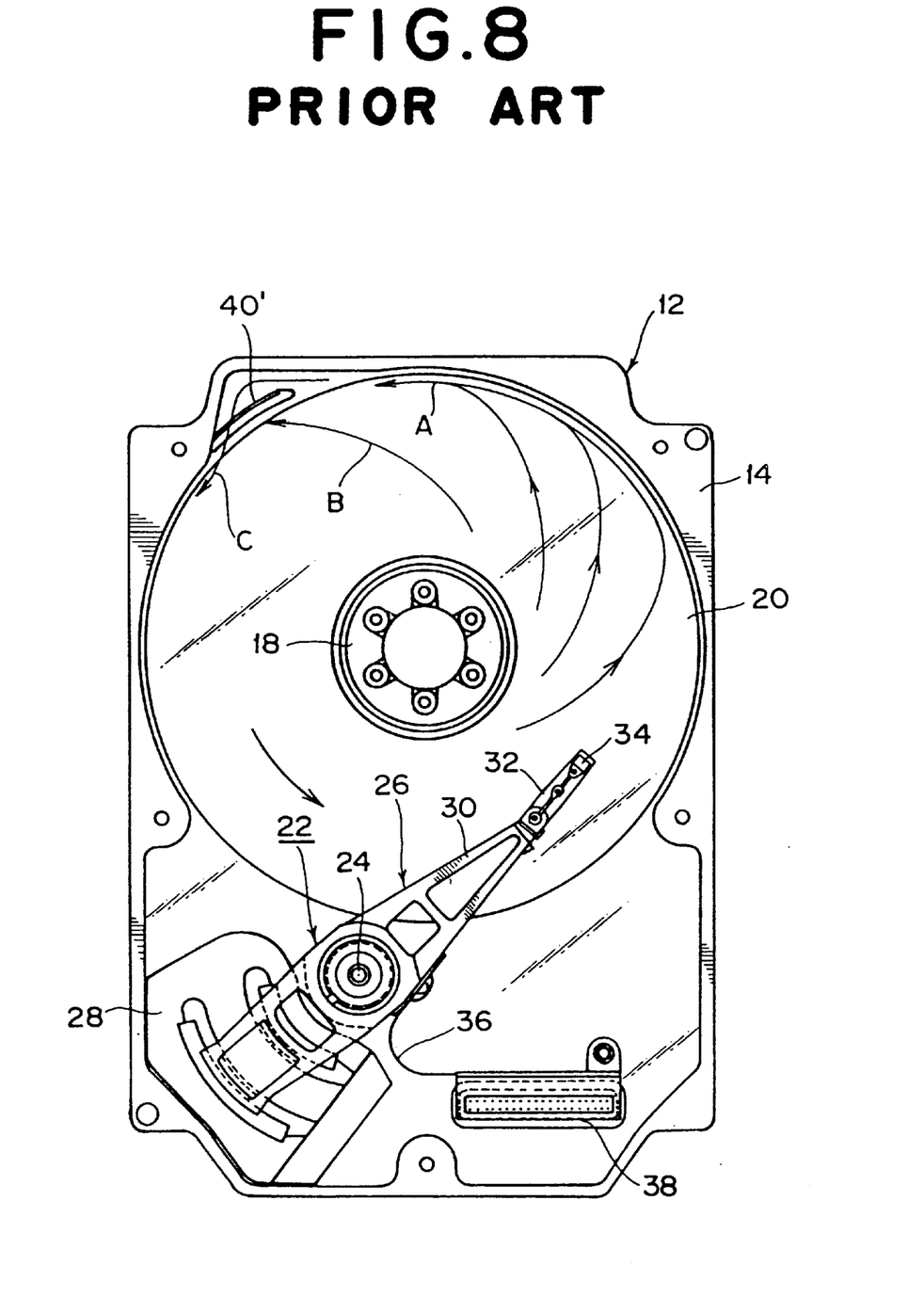
FIG. 8 is a top plan view of another magnetic disk drive in the prior art.

Referring next to FIG. 8, there is shown another conventional magnetic disk drive which has seen increased use in recent years. The magnetic disk drive shown in FIG. 8 employs a circulation filter 40' located at a position opposite to the head actuator 22 with respect to the center of the magnetic disks 20. The circulation filter 40' is mounted in such a manner that the filter 40' is attached to a resin molding frame and the frame is fitted with the base 14 or the cover. Owing to this location of the circulation filter 40', an air flow generated by the rotation of the magnetic disks 20 steadily advances along the inner wall surface of the base 14 and is efficiently directed toward the circulation filter 40' as shown by an arrow A in FIG. 8. Accordingly, more dust can be collected per unit time in comparison with the prior art shown in FIG. 7.

However, yet in the prior art shown in FIG. 8, an air flow shown by an arrow B acts so as to reverse an air flow shown by an arrow C passing through the filter 40'. As a result, the air flow C passing through the filter 40' is decreased in quantity by a reverse flow component, thus reducing a dust collection efficiency..

SUMMARY OF THE INVENTION

It is therefore an object of the present invention to provide a circulation filter mounting structure in a disk drive which can improve the dust collection efficiency.

In accordance with an aspect of the present invention, there is provided a circulation filter mounting structure in a disk drive including a housing having a base and a cover fixed to the base, a disk as a storage medium rotatably contained in the housing, and a head contained in the housing for recording and reproducing data on the disk; the circulation filter mounting structure comprising a wall provided between an outer circumference of the disk and an inner surface of the housing, for partially blocking an air flow generated by rotation of the disk, the wall extending in a direction substantially perpendicular to a radial direction of the disk; and a filter mounted between the wall and the inner surface of the housing, for collecting dust.

Preferably, the filter is bent to have a substantially V-shaped configuration, and the wall is integrally formed with the base.

Since the wall is provided between the outer circumference of the disk and the inner surface of the housing so as to extend in a direction substantially perpendicular to the radial direction of the disk, a reverse flow component of the air flow passing through the filter can be eliminated by the wall, thereby preventing a reduction in the quantity of the air flow passing through the circulation filter and improving the dust collection efficiency.

DETAILED DESCRIPTION OF THE PREFERRED EMBODIMENTS

Some preferred embodiments of the present invention will now be described with reference to the drawings. In the following description of the preferred embodiments, substantially the same parts as those in the prior art shown in FIGS. 7 and 8 will be denoted by the same reference numerals, and the explanation thereof will be omitted to avoid repetition.

Figure 1:
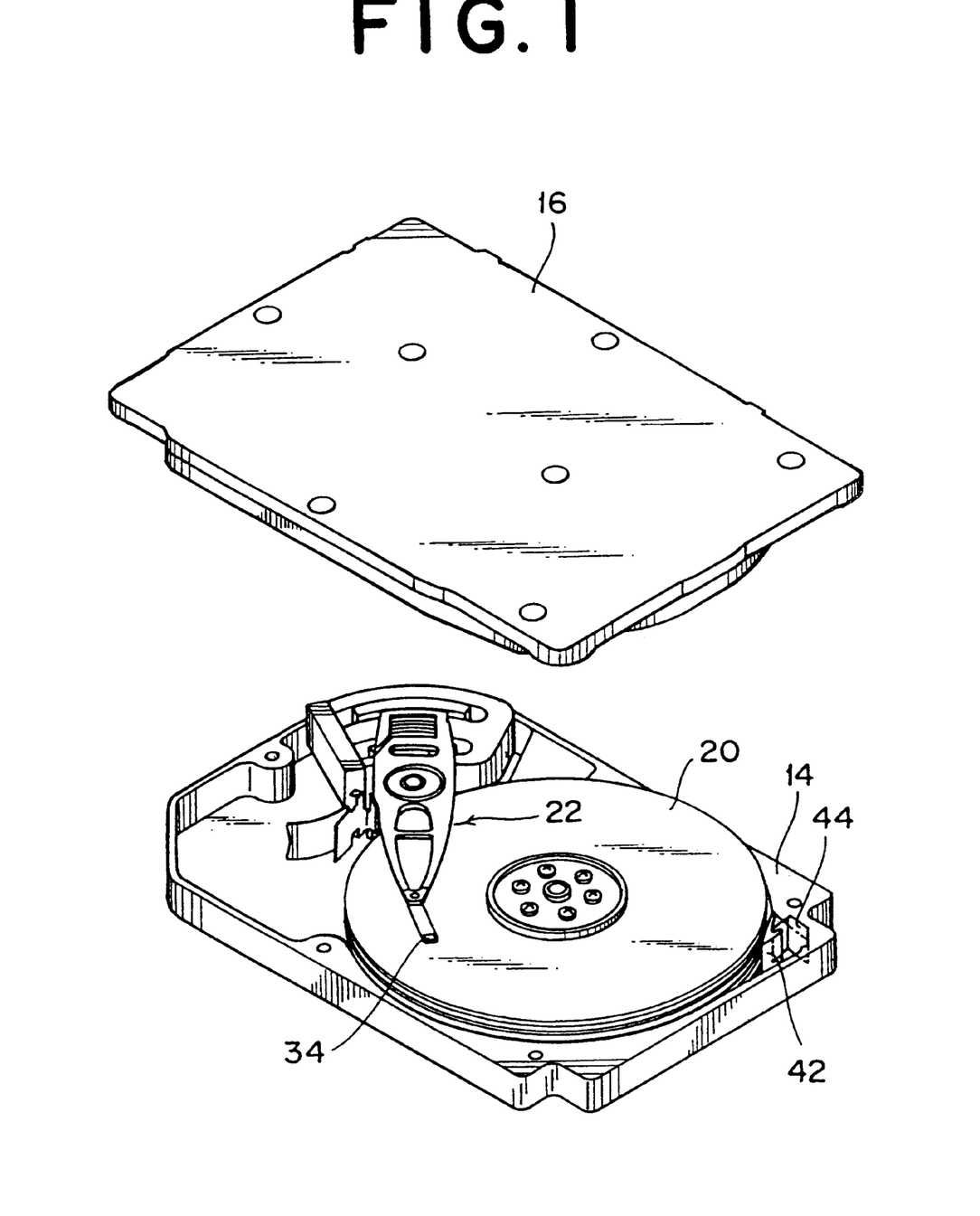
FIG. 1 is a perspective view of a magnetic disk drive according to a preferred embodiment of the present invention under the condition where a cover is removed.
Figure 2:
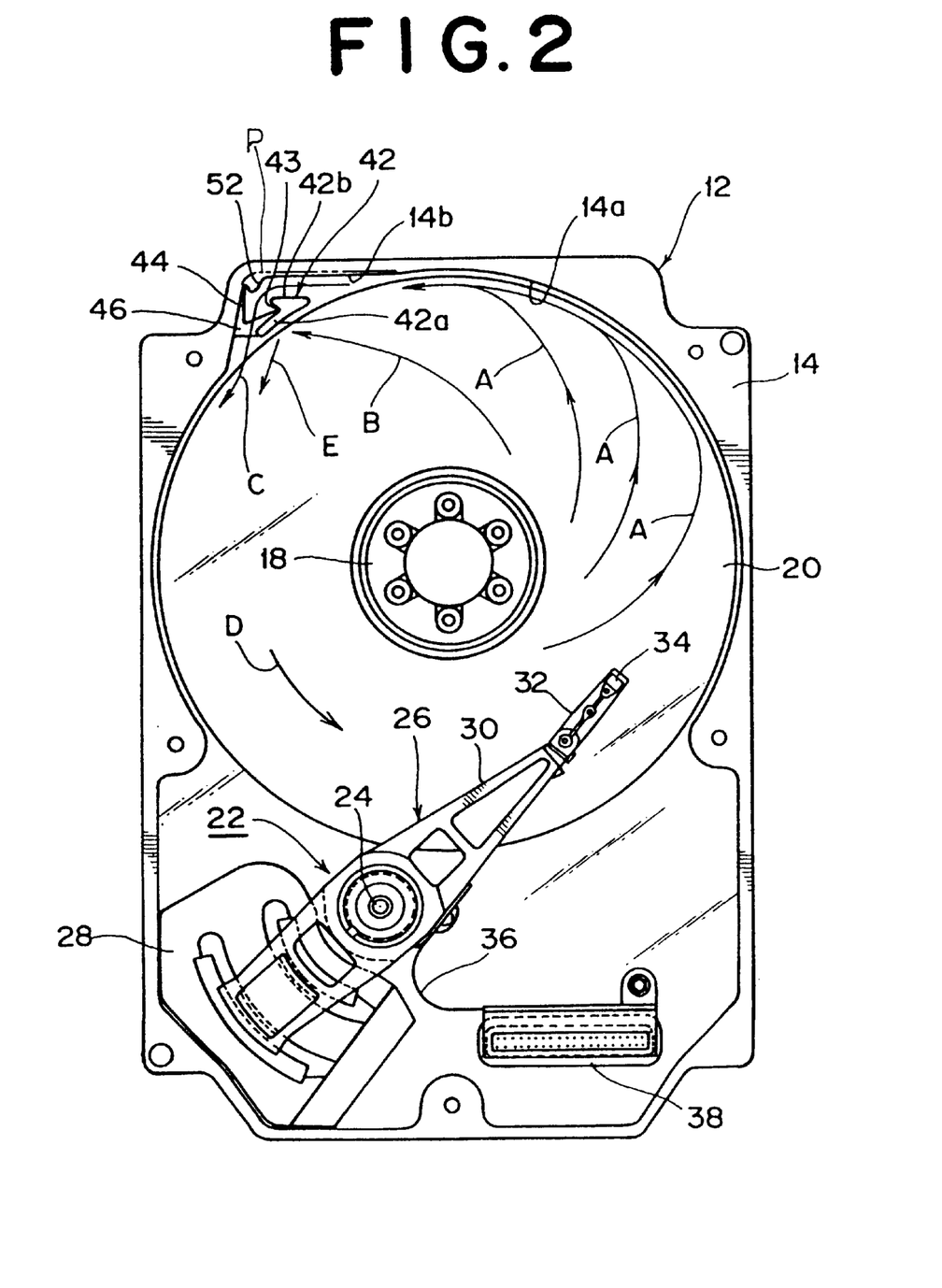
FIG. 2 is a top plan view of the magnetic disk drive shown in FIG. 1.
Figure 4:
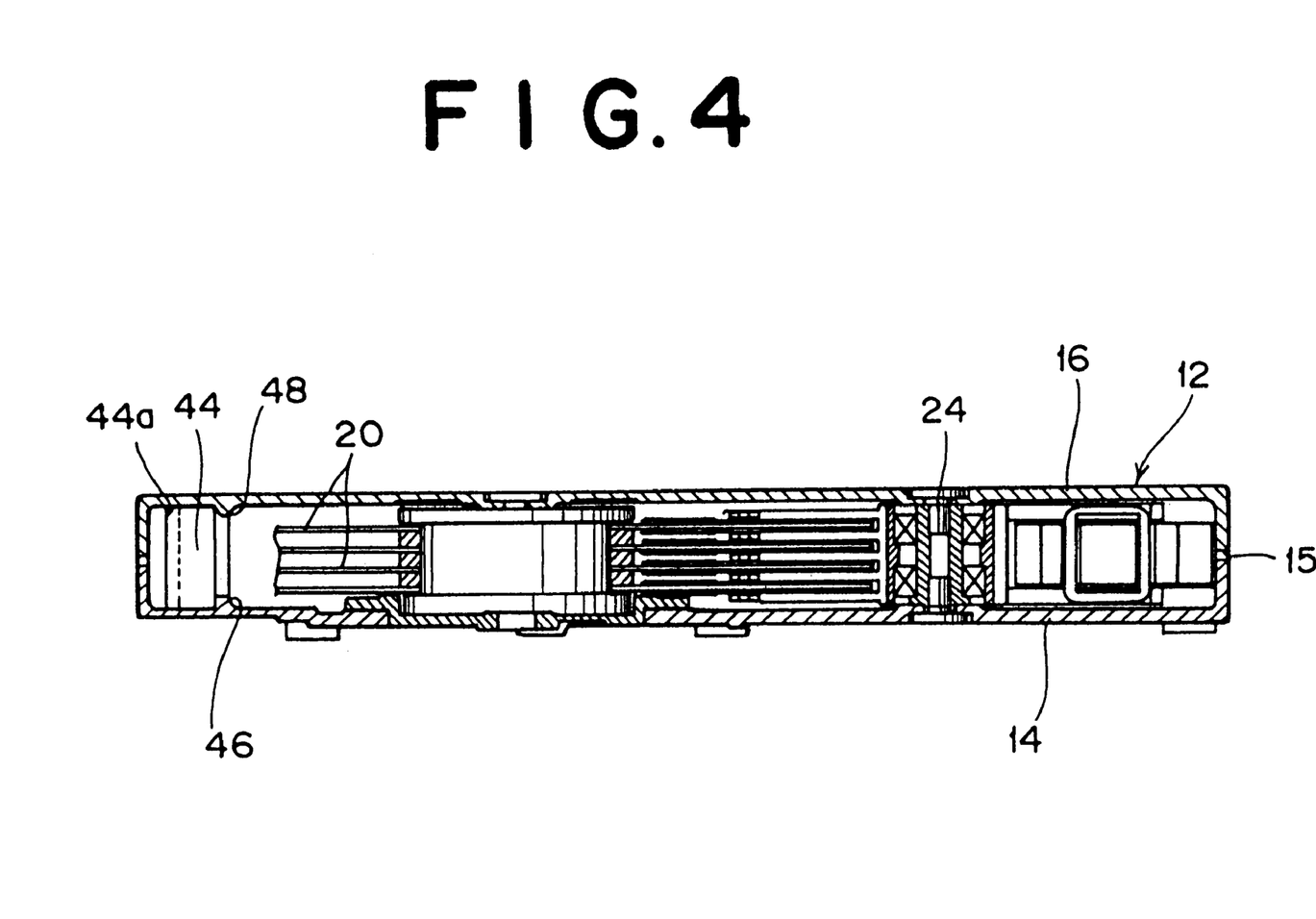
FIG. 4 is a vertical sectional view of the magnetic disk drive shown in FIG. 1.

Referring to FIG. 1, there is shown a perspective view of a magnetic disk drive having a circulation filter mounting structure according to a preferred embodiment of the present invention under the condition where a cover 16 is removed. As shown in FIG. 4, a housing 12 defining a sealed chamber therein is constructed by interposing an annular packing 15 between a base 14 and the cover 16, and securing the cover 16 to the base 14 by screws. As shown in FIGS. 1 and 2, a wall 42 for partially blocking air flows generated by the rotation of plural magnetic disks 20 is provided between the outer circumference of the disks 20 and the inner peripheral surface of the base 14 in slightly spaced relationship with the outer circumference of the disks 20.

The wall 42 has a first portion 42a extending in a direction substantially perpendicular to the radial direction of the disks 20 and a second portion 42b projecting from the first portion 42a and having a flat surface extending substantially parallel to an inner wall surface 14b of the base 14. A recess 43 is formed between the first portion 42a and the second portion 42b. A passage for an air flow C is defined between the second portion 42b of the wall 42 and the inner wall surface 14b of the base 14. A V-shaped filter 44 is located between the wall 42 and the inner wall surface 14b of the base 14 so as to block the passage for the air flow C. The V-shaped filter 44 may be replaced by a W-shaped filter or any filter having another shape.

The filter 44 is formed of polytetrafluoroethylene, for example. As apparent from FIG. 1, the wall 42 extends in the axial direction of the plural magnetic disks 20 over the total thickness thereof. When the magnetic disks 20 are rotated in the direction shown by an arrow D in FIG. 2, spiral air flows as shown by arrows A are generated by the friction between the disks 20 and air. The air having come outside the outer circumference of the disks 20 is allowed to flow along an inner wall surface 14a of the base 14

The air having flowed along the inner wall surface 14a of the base 14 is allowed to pass between the inner wall surface 14b of the base 14 and the second portion 42b of the wall 42, and then pass through the filter 44. While the air is passing through the filter 44, dust contained in the air is collected by the filter 44. On the other hand, an air flow shown by an arrow B strikes against the wall 42 and is deflected in the direction shown by an arrow E. Accordingly, the air flow B is prevented from colliding with the filter 44 on its air flow outlet side. As a result, a reverse flow component of the air flow C passing through the filter 44 can be eliminated to thereby prevent a decrease in quantity of the air flow C passing through the filter 44 and accordingly improve a dust collection efficiency.

The wall 42 is integrally formed with the base 14 in this preferred embodiment. This is due to the fact that if the wall 42 is formed separately from the base 14, a component cost and an assembly step for the wall 42 becomes necessary. However, the wall 42 may be formed separately from the base 14. In this case, the wall 42 is fixed to the base 14 by using an adhesive or by forming a hole through the base 14 and fitting the wall 42 into this hole.

Since the filter 44 is bent to have a V-shape, the effective filter area can be increased, and the vertical rigidity is also increased. Accordingly, the filter 44 can be set without any reinforcing member by inserting the filter 44 into the recess 43 of the wall 42. If the filter 44 is merely disposed on the base 14, there is a possibility that the filter 44 may be blown toward the downstream side by the wind force of the air flow C. To cope with this, a projection 46, of a height tall enough to catch the lower portion of the filter 44 is formed on the bottom inner surface of the base 14 to extend along the entire portion on the air flow outlet side of the filter 44. Alternatively, the projection 46 may be formed on the bottom inner surface of the base 14 at only a portion corresponding to the central bent portion of the filter 44.

Figure 3:
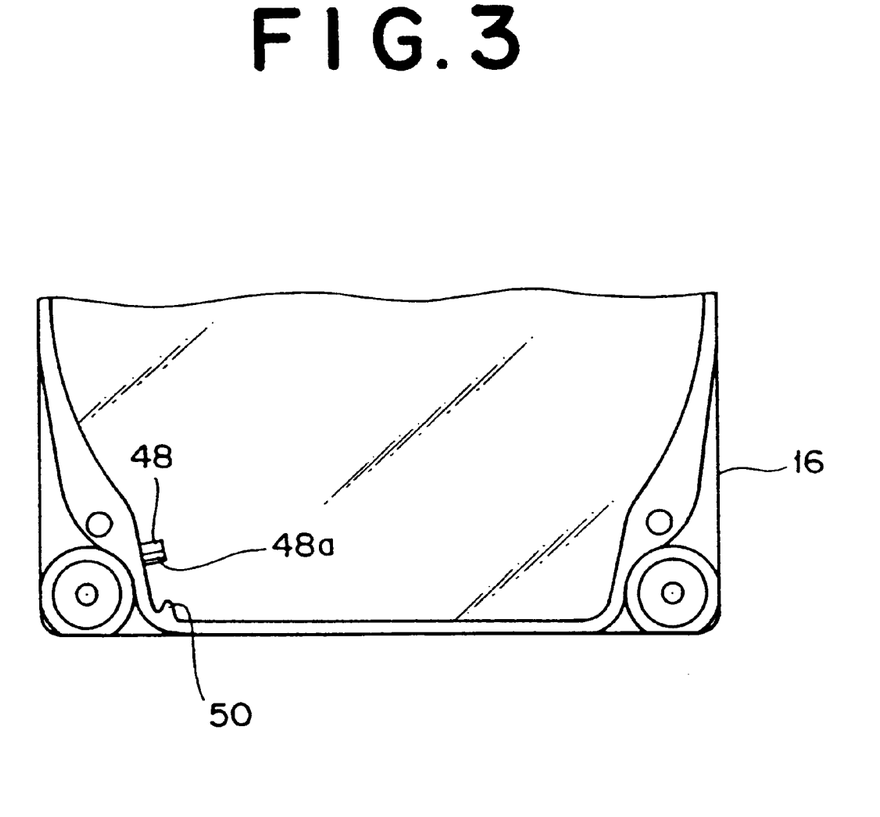
FIG. 3 is a fragmentary bottom plan view of the cover shown in FIG. 1.

As shown in FIG. 3, a projection 48 having a height tall enough to catch an upper portion of the filter 44 is similarly formed on the top inner surface of the cover 16, at least at a portion corresponding to the central bent portion of the filter 44. Owing to the projections 46 and 48 formed on the base 14 and the cover 16, the filter 44 can be prevented from being blown down by the wind force of the air flow C. As another method for preventing the filter 44 from being blown away or blown down by the wind force, a part of the packing 15 interposed between the base 14 and the cover 16 may be projected inward of the housing 12 so as to support the most downstream portion of the filter 44, i.e., the central bent portion of the filter 44 on its air flow outlet side.

In constructing the housing 12, the cover 16 shown in FIG. 3 is put on the base 14 from the upper side thereof. At this time, if the position of the cover 16 relative to the base 14 is offset or if the filter 44 set on the base 14 is inclined, there is a possibility that the upper angular edge of the V-shaped bent portion of the filter 44 may be damaged by the projection 48 of the cover 16. To cope with this, the projection 48 is formed with an inclined surface 48a coming into contact with the filter 44. Accordingly, even if the relative position of the cover 16 is offset, for example, when putting the cover 16 on the base 14, the filter 44 may relatively slide over the inclined surface 48a of the projection 48 formed on the cover 16 until coming to a given stable position without damage.

Further, the upper corner edge of the outer portion of the filter 44 opposed tothe inner wall surface of the cover 16 may also possibly be damaged by the cover 16 in putting the cover 16 on the base 14. To cope with this, the inner wall surface of the cover 16 is shifted outward from the inner wall surface of the base 14, as shown by a phantom line P in FIG. 2, thereby preventing the damage to the upper corner edge of the outer portion of the filter 44. Furthermore, as shown in FIG. 4, the upper corner edge of the outer portion of the filter 44 is chamfered at 44a. With these specific structures, the possibility that the filter 44 may be damaged by the cover 16 can be almost eliminated. In addition, the chamfered portion 44a serves also as a guide for preventing the filter 44 from being erroneously set upside down.

As mentioned above, the inner wall surface of the cover 16 is shifted outward from the inner wall surface of the base 14, so as to prevent damage to the upper corner edge of the outer portion of the filter 44 by the cover 16. However, such shifting of the inner wall surface of the cover 16 causes generation of a gap between the inner wall surface of the cover 16 and the filter 44, resulting in the possibility that the air flow C may partially escape through this gap without passing through the filter 44. To dope with this, a projection 50 is formed on the inner wall surface of the cover 16 at a position just upstream of this gap so as to cover the outer side portion of the filter 44, as shown in FIG. 3. Owing to the projection 50, the air flow directed to this gap is deflected toward the filter 44 and passes through the filter 44.

The inner wall surface of the base 14 is in contact with the outer side portion of the filter 44. However, if the outer side portion of the filter 44 is bent, a gap is possibly generated between the inner wall surface of the base 14 and the outer side portion of the filter 44. To cope with this, as similar to the case of the cover 16 mentioned above, a projection 52 is formed on the inner wall surface of the base 14 at a position just upstream of the outer side portion of the filter 44 so as to cover the same as shown in FIG. 2. Further, to avoid generation of a gap between the bottom inner surface of the base 14 and the lower end of the filter 44 and generation of a gap between the top inner surface of the cover 16 and the upper end of the filter 44, the height of the filter 44 is set slightly larger than the distance between the bottom inner surface of the base 14 and the top inner surface of the cover 16, which distance is determined at the time the cover 16 is mounted on the base 14.

In the case where the height of the housing 12 of the magnetic disk drive is relatively small with respect to the diameter of each disk 20, the above structure for mounting the filter 44 is sufficient. However, in the case where the height of the housing 12 is relatively large with respect to the diameter of each disk 20, the height of the filter 44 becomes relatively large with respect to the area of the lower end surface of the filter 44, causing instability of the filter 44 disposed on the base 14. As a result, there is a possibility that the filter 44 may be bent horizontally at its central portion and blown away to the downstream side by the wind force of the air flow C.

To cope with this, a rectangular sheet metal frame bent in a V-shape corresponding to the V-shape of the filter 44 may be used to support the filter 44 from the downstream side. The filter 44 may be bonded to the sheet metal frame. Further, the sheet metal frame may be formed of a magnetic material, in which case the sheet metal frame with the filter 44 is magnetically attracted from the lower side of the base 14 by using a magnet in mounting the filter 44 on the base 14, thereby stably setting the filter 44 at a given position.

In the case where the height of the housing 12 of the magnetic disk drive is relatively large with respect to the diameter of each disk 20, the height of the wall 42 integrally formed with the base 14 becomes resultantly large, causing the possibility that the wall 42 may be broken at the time of forming the wall 42. In this case, a V-shaped frame for supporting the filter 44 and the wall 42 are integrally formed from a resin molding as a filter unit. Then, the filter unit is mounted at the given position on the base 14.

Figure 5:
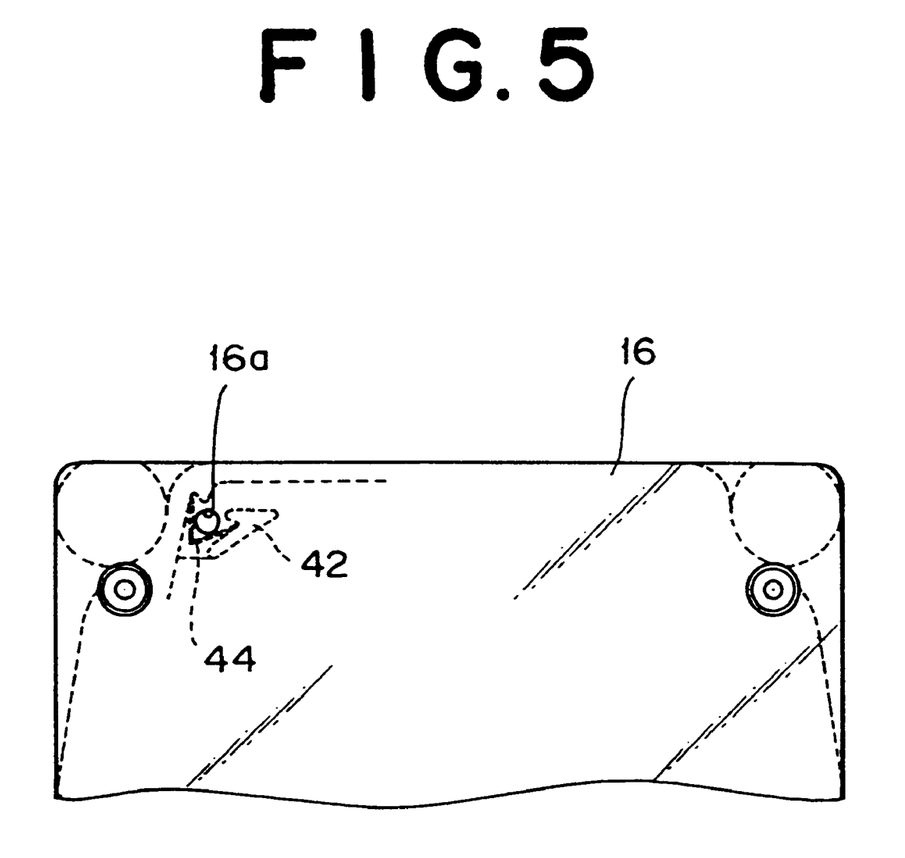
FIG. 5 is a fragmentary top plan view of another preferred embodiment of the cover.

Referring next to FIG. 5, there is shown another preferred embodiment of the cover 16. The cover 16 shown in FIG. 5 has a through hole 16a in the vicinity of the projection 48 shown in FIG. 3. The through hole 16a allows an operator to inspect the filter 44 after assembling the magnetic disk drive, so as to check whether or not the filter 44 has properly set in the desired position. In case the filter 44 has slightly slipped from the desired position or has been slightly deformed, such position slip or deformation of the filter 44 can be corrected by inserting a rod into the through hole 16a. Further, the through hole 16a may be used also as a dust measuring opening.

Although not shown, another through hole may also be formed through the base 14 at a similar position so as to be aligned with the through hole 16a of the cover 16. In this case, a light beam may be passed through these holes formed through the cover 16 and the base 14, thereby facilitating the check in position and the correction of the filter 44. While these holes must be hermetically sealed, transparent seals for sealing these holes are preferably used to allow the operator to inspect the filter 44 from the outside of the disk drive through the holes even at any sites other than a clean room. Accordingly, in the event that a large-sized dust particle such as a thread chip has been generated and entrapment of the dust particle by the filter 44 is observed through the holes, the magnetic disk drive containing the dust particle can be rejected as a defective to eliminate the possibility of head crash or the like.

Figure 6:
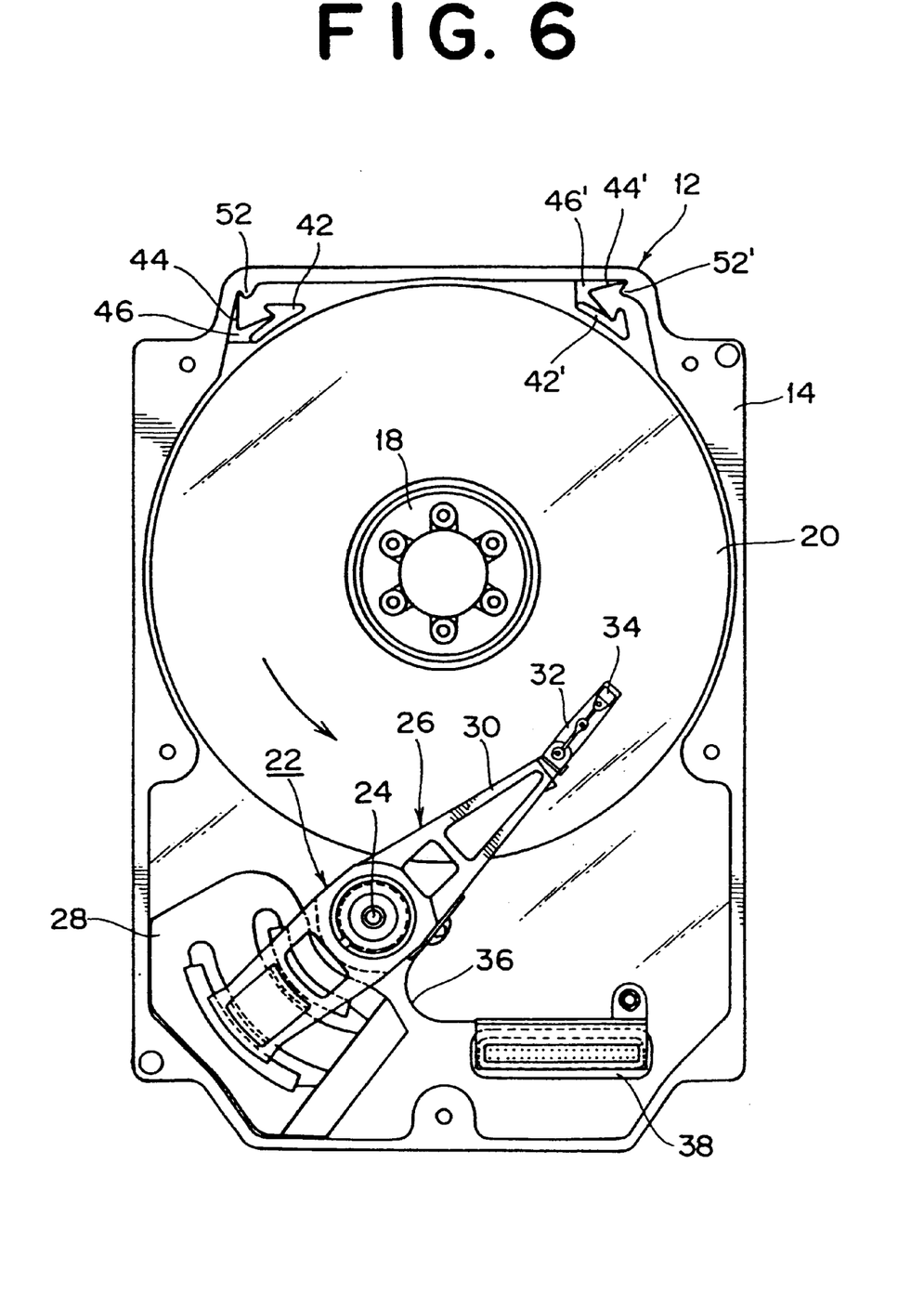
FIG. 6 is a top plan view similar to FIG. 2, showing another preferred embodiment of the present invention.

Referring to FIG. 6, there is shown a magnetic disk drive according to another preferred embodiment of the present invention. The magnetic disk drive shown in FIG. 6 has another circulation filter mounting structure consisting of a wall 42' and a filter 44' in addition to the above-mentioned circulation filter mounting structure consisting of the wall 42 and the filter 44. In this preferred embodiment, a space for forming the second circulation filter mounting structure is additionally secured in the base 14. Thus, two sets of circulation filter mounting structures are provided in this preferred embodiment to thereby further improve the dust collection efficiency.

Since the filters 44 and 44' are identical with each other and they can be commonly used at two positions, a component cost per filter can be reduced because of economies of scale in manufacturing. If other spaces for further mounting three or more circulation filters can be secured, it is apparent that dust can be collected more efficiently. Although the above-mentioned preferred embodiments of the present invention have been applied to a magnetic disk drive, the present invention may be applied also to other disk drives such as an optical disk drive.

As described above, the circulation filter mounting structure in the disk drive according to the present invention can effectively prevent a reverse flow component of the air flow passing through the filter to thereby improve the dust collection efficiency.

What is claimed is:

1. A circulation filter mounting structure in a disk drive including a housing having a base and a cover fixed to said base, a disk as a storage medium rotatably contained in said housing, and a head contained in said housing for recording and reproducing data on said disk; said circulation filter mounting structure comprising:

a wall for partially blocking an air flow generated by rotation of said disk, said wall being provided between an outer circumference of said disk and an inner surface of said housing, said wall extending in a direction substantially perpendicular to a radial direction of said disk;

a filter for collecting dust, said filter being mounted between said wall and said inner surface of said housing;

said base having a first projection for contacting a lower portion of said filter on an air outlet side; and said cover having a plane generally extending along the cover and a second projection for contacting an upper portion of said filter on an air outlet side, said second projection having a sloped surface with respect to said plane, whereby said sloped surface is adapted to slidingly contact said upper portion of said filter so that said filter is installed properly even when there is an offset between said cover and said base.

2. A circulation filter mounting structure in a disk drive according to claim 1, wherein said wall is integrally formed with said base.

3. A circulation filter mounting structure in a disk drive according to claim 1, wherein said filter is bent to have a substantially V-shaped configuration.

4. A circulation filter mounting structure in a disk drive according to claim 3, wherein an upper corner edge of an outer portion of said filter opposed to an inner wall surface of said cover is chamfered.

5. A circulation filter mounting structure in a disk drive according to claim 1, wherein an inner wall surface of said cover in the vicinity of said filter is shifted outwardly from a corresponding inner wall surface of said base formed above said inner wall surface of said cover.

6. A circulation filter mounting structure in a disk drive according to claim 1, further comprising a rectangular frame for supporting said filter, said rectangular frame and said wall integrally formed with each other from a resin molding.

7. A circulation filter mounting structure in a disk drive according to claim 1, wherein a top wall of said cover has a first through hole at a position just upstream of said filter, said first through hole being closed by a first transparent seal.

8. A circulation filter mounting structure in a disk drive according to claim 7, wherein a bottom wall of said base has a second through hole aligned with said first through hole of said cover, said second through hole being closed by a second transparent seal.

9. A circulation filter mounting structure in a disk drive according to claim 1, wherein said wall has a projection having a surface extending substantially parallel to an inner wall surface of said base, and a passage for a part of said air flow is defined between said projection of said wall and said inner wall surface of said base.

10. A circulation filter mounting structure in a disk drive including a housing having a base and a cover fixed to said base, a disk as a storage medium rotatably contained in said housing and a head contained in said housing for recording and reproducing data on said disk; said circulation filter mounting structure comprising:

a plurality of walls for partially blocking an air flow generated by rotation of said disk, said plurality of walls being provided between an outer circumference of said disk and an inner surface of said housing, said walls extending in a direction substantially perpendicular to a radial direction of said disk;

a plurality of filters for collecting dust, said plurality of filters being mounted between said walls and said inner surface of said housing;

said base having a plurality of first projections for contacting a lower portion of each of said filters on an air outlet side; and said cover having a plane generally extending along the cover and a plurality of second projections for contacting an upper portion of said filters on an air outlet side, each of said second projections having a sloped surface with respect to said plane, whereby each of said sloped surfaces is adapted to slidingly contact said upper portion of each of said filters so that said filter is installed properly even when there is an offset between said cover and said base.

11. A circulation filter mounting structure in a disk drive according to claim 10, wherein said plurality of walls have substantially the same shape, and said plurality of filters have substantially the same V-shape.

12. A circulation filter mounting structure in a disk drive including a housing having a base and a cover fixed to said base, a disk as a storage medium rotatably contained in said housing, and a head contained in said housing for recording and reproducing data on said disk; said circulation filter mounting structure comprising:

a wall for partially blocking an air flow generated by rotation of said disk, said wall being provided between an outer circumference of said disk and an inner surface of said housing, said wall extending in a direction substantially perpendicular to a radial direction of said disk;

a filter for collecting dust having an inlet face and an outlet face, said faces generally extending perpendicular to a surface of said disk, said filter being mounted between and supported by said wall and said inner surface of said housing; and a support for bracing said filter, said support having portions extending from both said base and said cover, both said portions being contiguous to said outlet face , whereby said filter is supported adjacent both said base and said cover.

13. A circulation filter mounting structure in a disk drive according to claim 12, wherein said portion on said base includes a first projection positioned on said base, said first projection for contacting a lower portion of said outlet face of said filter; and said filter being bent to have a substantially V-shaped configuration.

14. A circulation filter mounting structure in a disk drive according to claim 13, wherein said portion on said cover includes a second projection positioned on said cover, said second projection contacting an upper portion of said outlet face of said filter.

15. A circulation filter mounting structure in a disk drive according to claim 14, wherein a side wall of said base has a third projection for contacting an outer side portion of said inlet face of said filter.

16. A circulation filter mounting structure in a disk drive according to claim 15, wherein a side wall of said cover formed over said side wall of said base has a fourth projection for contacting said outer side portion of said inlet face of said filter.

17. A circulation filter mounting structure in a disk drive according to claim 12, wherein said filter being bent to have a substantially V-shaped configuration and having a height larger than a distance between a bottom inner surface of said base and a top inner surface of said cover.

18. A circulation filter mounting structure in a disk drive according to claim 12, further comprising: said filter being bent to have a substantially V-shaped configuration, and said support including a rectangular frame bent in a V-shape for supporting said filter.

19. A circulation filter mounting structure in a disk drive according to claim 18, wherein said rectangular frame is formed of a magnetic material.

20. A disk drive comprising:

a housing including a base and a cover fixed to said base;

a disk as a storage medium rotatably contained in said housing;

a head contained in said housing for recording and reproducing data on said disk;

a filter having an inlet face and an outlet face, said faces generally perpendicular to the surface of said disk;

a first supporting portion formed on said base outside of said disk, said first supporting portion extending in a direction substantially perpendicular to a surface of said disk;

a second supporting portion formed on said base outside of said disk, said second supporting portion extending in a direction substantially perpendicular to the surface of said disk, said second supporting portion being separated from said first supporting portion by a given distance;

a generally V-shaped third supporting portion contiguous to either said inlet or outlet face of said filter and formed on said base;

a fourth supporting portion projecting from said cover; and a filter bent along a folding line to a substantially V-shaped configuration, said filter having a first edge including a first end of the V-shaped configuration, whereby said first edge extends parallel to the folding line, a second edge including a second end of the V-shaped configuration, whereby said second edge also extends parallel to the folding line, said filter being mounted such that said first and second edges are supported by said first and second supporting portions, respectively, a first bent end supported by said third supporting portion, and a second bent end supported by said fourth supporting portion when said cover is fixed to said base.

21. A disk drive according to claim 20 wherein said fourth supporting portion comprises a projection contacting the second bent end of said filter.

22. A disk drive according to claim 21 wherein said cover has a plane generally extending along said cover, and said projection has a sloped surface with respect to said plane adapted to slidingly contact the second bent end of said filter.

* * * * *

UNITED STATES PATENT AND TRADEMARK OFFICE
CERTIFICATE OF CORRECTION

PATENT NO. : 5,995,323
DATED : November 30, 1999
INVENTOR(S) : Jinbo et al.

It is certified that error appears in the above-identified patent and that said Letters Patent is hereby corrected as shown below:

Column 7, line 21, claim 6

(renumbered as claim 15) please delete "wall integrally" and insert --wall being integrally-- therefor Signed and Sealed this Twenty-second Day of May, 2001

Attest:

NICHOLAS P. GODICI

Attesting Officer

Acting Director of the United States Patent and Trademark Office